(12) United States Patent
Roberts et al.

(10) Patent No.: US 10,040,184 B2
(45) Date of Patent: *Aug. 7, 2018

(54) REAR HANDLE

(71) Applicant: Black & Decker Inc., Newark, DE (US)

(72) Inventors: Ana-Maria Roberts, Idstein (DE); Andreas Friedrich, Limburg (DE)

(73) Assignee: Black & Decker Inc., New Britain, CT (US)

( * ) Notice: Subject to any disclaimer, the term of this patent is extended or adjusted under 35 U.S.C. 154(b) by 341 days.

This patent is subject to a terminal disclaimer.

(21) Appl. No.: 14/602,677

(22) Filed: Jan. 22, 2015

(65) Prior Publication Data

US 2015/0202764 A1    Jul. 23, 2015

(30) Foreign Application Priority Data

Jan. 23, 2014  (GB) .................................. 1401091.2
Mar. 12, 2014  (GB) .................................. 1404361.6

(51) Int. Cl.
*B25D 17/11*     (2006.01)
*B25D 17/24*     (2006.01)
(Continued)

(52) U.S. Cl.
CPC .......... *B25D 17/24* (2013.01); *B23Q 11/0032* (2013.01); *B25D 17/043* (2013.01);
(Continued)

(58) Field of Classification Search
CPC ......... B25D 17/043; B25D 17/24; B25F 5/02; B25F 5/006; B23Q 11/0032
(Continued)

(56) References Cited

U.S. PATENT DOCUMENTS 2,592,649 A * 4/1952 Brackett ................ B21D 39/16
                                                  173/170
4,347,450 A * 8/1982 Colligan ............... B23B 45/003
                                                  310/50
(Continued)

FOREIGN PATENT DOCUMENTS

DE      1186000      3/1959
DE      4124574.1    1/1993
(Continued)

OTHER PUBLICATIONS

European search report dated Jun. 23, 2015 issued in corresponding EP patent application No. 14194752.3.
(Continued)

*Primary Examiner* — Robert Long
(74) *Attorney, Agent, or Firm* — Amir R. Rohani

(57) ABSTRACT

A power tool includes a housing; a handle having two ends, each being moveably mounted to the housing associated mountings; and a biasing mechanism connected between the housing and the handle; wherein at least one of the mountings comprises: a first part mounted on the housing and a second part mounted on the one end of the handle, one part comprising a passageway, the other comprising a rod, having a longitudinal axis, which is located in and capable of being axially slid within the passageway, enabling the end of the handle to move towards or away from the housing; at least part of the wall of the passageway in a lengthwise direction of the passageway comprises a curved convex support surface capable of engaging the side of the rod to enable the rod to pivot within the passageway about an axis which is perpendicular to the axis of the rod.

16 Claims, 9 Drawing Sheets

(51) Int. Cl.
  *B25D 17/00*   (2006.01)
  *B25F 5/00*   (2006.01)
  *B23Q 11/00*   (2006.01)
  *B25D 17/04*   (2006.01)
(52) U.S. Cl.
  CPC ........ *B25F 5/006* (2013.01); *B25D 2250/121* (2013.01); *B25D 2250/371* (2013.01)
(58) Field of Classification Search
  USPC .............................................. 173/162.1, 170
  See application file for complete search history.

(56) References Cited

U.S. PATENT DOCUMENTS

| | | | | |
|---|---|---|---|---|
| 4,401,167 | A * | 8/1983 | Sekizawa | B25D 17/043 173/162.1 |
| 4,800,965 | A * | 1/1989 | Keller | B25D 17/043 173/162.2 |
| 5,176,339 | A * | 1/1993 | Schmidt | B64D 27/00 244/131 |
| 5,522,466 | A * | 6/1996 | Harada | B25F 5/006 173/162.2 |
| 5,528,795 | A * | 6/1996 | Gramegna | A45C 13/26 16/408 |
| 5,647,095 | A * | 7/1997 | Takimoto | E05B 1/0015 16/405 |
| 5,697,456 | A * | 12/1997 | Radle | B25F 5/006 173/162.2 |
| 5,699,865 | A | 12/1997 | Foerderer et al. | |
| 6,148,930 | A * | 11/2000 | Berger | B25F 5/006 173/162.2 |
| 7,100,706 | B2 * | 9/2006 | Meixner | B25D 17/043 173/162.1 |
| 7,500,527 | B2 | 3/2009 | Fischer et al. | |
| 7,523,790 | B2 | 4/2009 | Arakawa et al. | |
| 7,591,325 | B2 * | 9/2009 | Robieu | B25D 17/043 173/162.2 |
| 7,610,967 | B2 | 11/2009 | Fischer et al. | |
| 7,637,328 | B2 | 12/2009 | Sato | |
| 7,836,971 | B2 | 11/2010 | Kikuchi et al. | |
| 7,886,838 | B2 | 2/2011 | Hahn | |
| 8,091,651 | B2 | 1/2012 | Kuhnle | |
| 8,234,756 | B2 | 8/2012 | Hahn et al. | |
| 2003/0037937 | A1* | 2/2003 | Frauhammer | B25D 16/006 173/48 |
| 2005/0263308 | A1* | 12/2005 | Chang | B25D 17/24 173/210 |
| 2006/0185867 | A1* | 8/2006 | Frauhammer | B25D 17/043 173/162.1 |
| 2006/0219418 | A1* | 10/2006 | Arakawa | B25D 17/043 173/162.2 |
| 2008/0006426 | A1* | 1/2008 | Friedrich | B03C 1/286 173/210 |
| 2008/0210447 | A1 | 9/2008 | Robieu | |
| 2008/0257676 | A1* | 10/2008 | Shaffer | F16D 1/108 192/25 |
| 2009/0049651 | A1 | 2/2009 | Roberts et al. | |
| 2009/0188692 | A1 | 7/2009 | Hahn et al. | |
| 2009/0314507 | A1* | 12/2009 | Iwakami | B25D 17/043 173/162.2 |
| 2009/0321101 | A1 | 12/2009 | Furusawa et al. | |
| 2010/0012339 | A1* | 1/2010 | Hahn | B25F 5/006 173/162.2 |
| 2010/0018734 | A1 | 1/2010 | Frauhammer et al. | |
| 2010/0186979 | A1* | 7/2010 | Krauter | B25F 5/006 173/162.2 |
| 2010/0193209 | A1* | 8/2010 | Schadow | B24B 23/04 173/162.2 |
| 2010/0263896 | A1* | 10/2010 | Brennenstuhl | B25F 5/006 173/217 |
| 2011/0127056 | A1* | 6/2011 | Friedrich | B25D 17/043 173/162.2 |
| 2012/0031639 | A1* | 2/2012 | Roberts | B25D 17/043 173/162.2 |
| 2012/0067605 | A1 | 3/2012 | Furusawa et al. | |
| 2013/0025897 | A1* | 1/2013 | Harcar | B25D 17/043 173/162.2 |
| 2013/0043052 | A1* | 2/2013 | Harcar | B25D 17/043 173/162.2 |
| 2015/0202760 | A1* | 7/2015 | Roberts | B25D 17/043 173/162.2 |
| 2015/0202761 | A1* | 7/2015 | Roberts | B25D 17/043 173/162.2 |
| 2015/0202762 | A1* | 7/2015 | Roberts | B25D 17/043 173/162.2 |

FOREIGN PATENT DOCUMENTS

| | | |
|---|---|---|
| DE | 10236135 | 2/2004 |
| DE | 102005021731.2 | 11/2006 |
| DE | 102006044433.7 | 3/2008 |
| EP | 0949988 | 12/1997 |
| EP | 1533084 | 5/2005 |
| EP | 2456805 | 7/2009 |
| EP | 2103391 | 9/2009 |
| EP | 2103392 | 9/2009 |
| EP | 2119537 | 11/2009 |
| EP | 2138278 | 12/2009 |
| EP | 2181810 | 5/2010 |
| EP | 2253430 | 11/2010 |
| EP | 2289669 | 3/2011 |
| EP | 2384859 | 11/2011 |
| EP | 2384860 | 11/2011 |
| EP | 2415561 | 2/2012 |
| EP | 2415562 | 2/2012 |
| EP | 2468455 | 6/2012 |
| EP | 2551061 | 1/2013 |
| GB | 2137132 | 10/1984 |
| GB | 2431610 | 5/2007 |
| GB | 2456805 | 7/2009 |
| WO | 9829220 | 7/1998 |
| WO | 2008034668 | 3/2008 |

OTHER PUBLICATIONS

Non FInal Office Action dated May 25, 2017 issued in corresponding U.S. Appl. No. 14/602,695.
Notice of Allowane dated Jun. 30, 2017 issued in corresponding U.S. Appl. No. 14/602,677.
Non Final Office Action dated Oct. 30, 2017 issued in corresponding U.S. Appl. No. 14/602,677.
Non Final Office Action dated Nov. 17, 2017 issued in corresponding U.S. Appl. No. 14/602,695.
Non Final Office Action dated Aug. 9, 2017 issued in corresponding U.S. Appl. No. 14/602,637.
Non Final Office Action dated Jun. 7, 2017 issued in corresponding U.S. Appl. No. 14/602,658.
Notice of Allowane dated Nov. 20, 2017 issued in corresponding U.S. Appl. No. 14/602,658.
Extended EP Search Report dated Jun. 23, 2015 Issued in corresponding EP Patent Application No. 14194750.
Extended EP Search Report dated Jun. 23, 2015 Issued in corresponding EP Patent Application No. 14194755.
Extended EP Search Report dated Jun. 25, 2015 Issued in corresponding EP Patent Application No. 14194751.
Final Office Action dated Feb. 22, 2018 issued in corresponding U.S. Appl. No. 14/602,637.

* cited by examiner

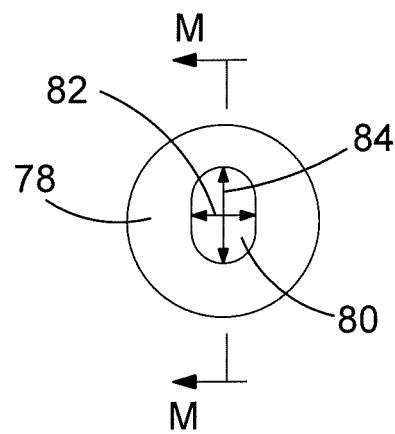
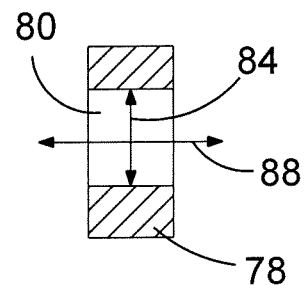
FIG.5A  FIG.5B
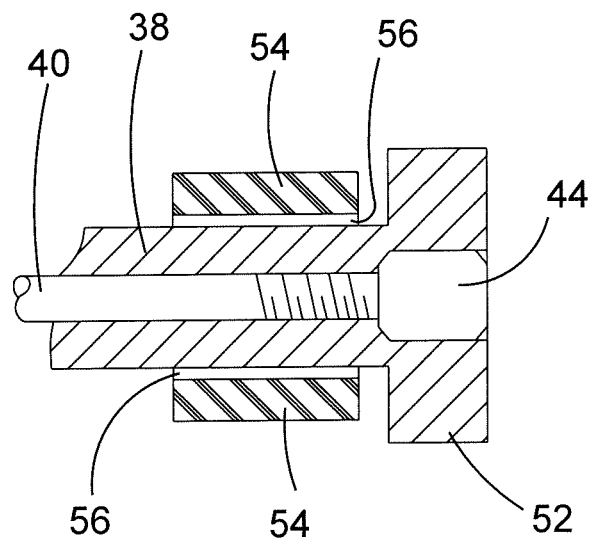
FIG.6

REAR HANDLE

CROSS-REFERENCE TO RELATED APPLICATIONS

This application claims priority, under 35 U.S.C. § 119, to UK Patent Application No. 1401091.2 filed Jan. 23, 2014 and UK Patent Application No. 1404361.6 filed Mar. 12, 2014, titled "Rear Handle."

FIELD OF THE INVENTION

The present invention relates to a handle for a power tool, in particular for a hammer drill, and in particular, to a mounting assembly for a rear handle on a hammer drill which reduces the amount of vibration transmitted to the handle.

BRIEF SUMMARY OF THE INVENTION

Power tools of all types comprise a body attached to which are handles by which an operator can support the tool. Vibrations are generated in the body during the operation of such tools which are transferred to the handles. It is desirable to minimize the amount of transfer.

A hammer drill can operate in one or more of the following modes of operation; hammer only mode, drill only mode and combined hammer and drill mode. EP1157788 discloses such a hammer. During the operation of such hammers, a considerable amount of vibration can be generated. The vibration is caused by the operation of the rotary drive mechanisms and/or the hammer mechanisms, depending on the mode of operation of the hammer drill, combined with the vibratory forces applied to and experienced by the cutting tool, such as a drill bit or chisel when it is being used on a work piece. These vibrations are transferred to the body of the hammer drill, which in turn are transferred to a rear handle being used by the operator to support the hammer drill. The transfer of vibration to the rear handle from the body, and subsequently to the operator's hand can not only be painful but can result in injury, particularly when the hammer drill is used over long periods of time. It is therefore desirable to minimize the amount of vibration transferred from the body to the rear handle.

One solution is to moveably mount the rear handle on the body of the hammer drill to allow relative movement between the two and to locate a vibration dampening mechanism between the body and the rear handle to minimize the amount of vibration transferred to the rear handle from the body.

EP2415561 and EP2415562 both describe two embodiments of such a vibration dampening mechanism for a hammer drill by which the amount of vibration transferred to the rear handle from the body is reduced. In each of the examples, the rear handle is connected via an upper mounting assembly, which enables the upper part of the handle to slide relative to the upper part of the housing, and a lower mounting assembly, which enables a pivoting movement of the lower part of the handle relative to the lower part of the housing.

Accordingly there is provided a power tool in accordance with claim 1.

BRIEF DESCRIPTION OF THE DRAWINGS

An embodiment of the present invention will now be described with reference to drawings of which:

FIG. 5A shows a side view of the insert and FIG. 5B shows a cross section view of the insert in the direction of Arrow M in FIG. 5A;

FIG. 6 shows a horizontal part cross sectional view of the rod and sleeve of the upper mounting assembly in the directions of Arrows C in FIG. 2;

DETAILED DESCRIPTION OF THE DRAWINGS

Figure 1:
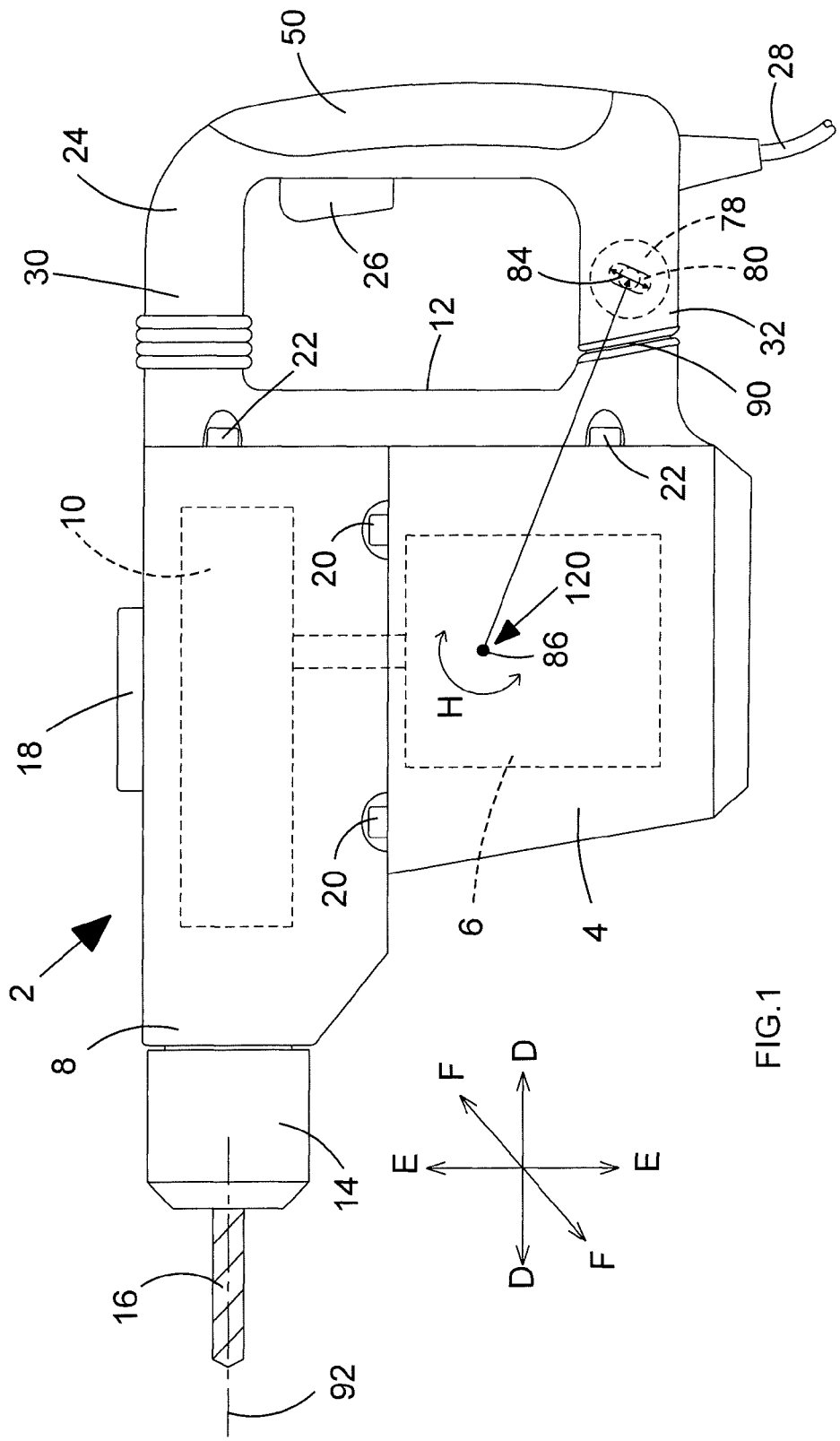
FIG. 1 shows a sketch of a side view of an existing design of a hammer drill.

Referring to FIG. 1, which shows an existing design of hammer drill, the hammer drill comprises a main housing 2 which comprises a motor housing 4, in which is mounted an electric motor 6, a gear housing 8 in which is mounted a rotary drive and hammer mechanism 10, and a rear housing 12. The motor housing 4 is connected to the gear housing 12 using bolts 20. Similarly, the rear housing 12 is attached to both of the motor housing 4 and gear housing 8 using bolts 22. A tool holder 14 is mounted on the front of the gear housing 8 which is capable of holding a cutting tool 16, such as a drill bit. The motor 6 rotatingly and/or reciprocatingly drives the cutting tool 16 via the rotary drive and/or hammer mechanism 10. The hammer drill can operate in three modes of operation, namely hammer only mode, drill only mode and combined hammer and drill mode. A mode change knob 18 is rotatably mounted on the top of the gear housing 8. Rotation of the knob 18 to predetermined angular positions activates or deactivates the rotary drive and/or hammer mechanism 10 to adjust the mode of operation of the hammer drill.

A rear handle 24 is moveably mounted to the rear housing 12 as will be described in more detail below. The rear handle 24 is manufactured from a plastic clam shell which provides a hollow cavity inside of the handle in which component parts of the hammer can located. A trigger switch 26 is mounted on the rear handle 24. An electric cable 28 enters the base of the rear handle 24 and connects to the electric motor via the trigger switch 26. Depression of the trigger switch 26 activates the motor. A rubber soft grip 50 is molded onto the rear of the rear handle 24 in well known manner.

The rear handle assembly of the existing design of hammer drill will now be described with reference to FIGS. 2 to 6.

The rear handle is mounted to the rear housing 12 at its two ends 30, 32. The top end 30 is mounted to the rear housing 12 via an upper mounting assembly 34. The upper mounting assembly 34 allows the top end 30 of the handle 12 to move towards or away from (Arrow D) the rear housing 12 over a large range of movement, whilst allowing limited movement in the directions of Arrows E and F relative to rear housing 12. The lower end 32 is mounted to the rear housing 12 via a lower mounting assembly 36. The lower mounting assembly 36 allows the lower end 32 of the handle to pivot (Arrow G—see FIG. 4) about a horizontal axis 58 relative to the rear housing 12, whilst allowing limited linear movement in the directions of Arrows D and E.

The upper mounting assembly 34 will now be described with reference to FIGS. 2 and 6. The upper mounting assembly 34 comprises a metal rod 38 which is rigidly attached to the rear housing 12 using a bolt 40. The bolt 40 passes through a hole 46 in the rear housing 12 and through the length of the rod 38. The head 42 of the bolt 40 abuts the rear housing 12. A nut 44 is screwed on the end of the bolt 40 and sandwiches the rod 38 and the part of the rear housing 12 with the aperture 46 between the head 42 of the bolt and the nut 44 thus locking the rod 38 to the rear housing 12.

Figure 2:
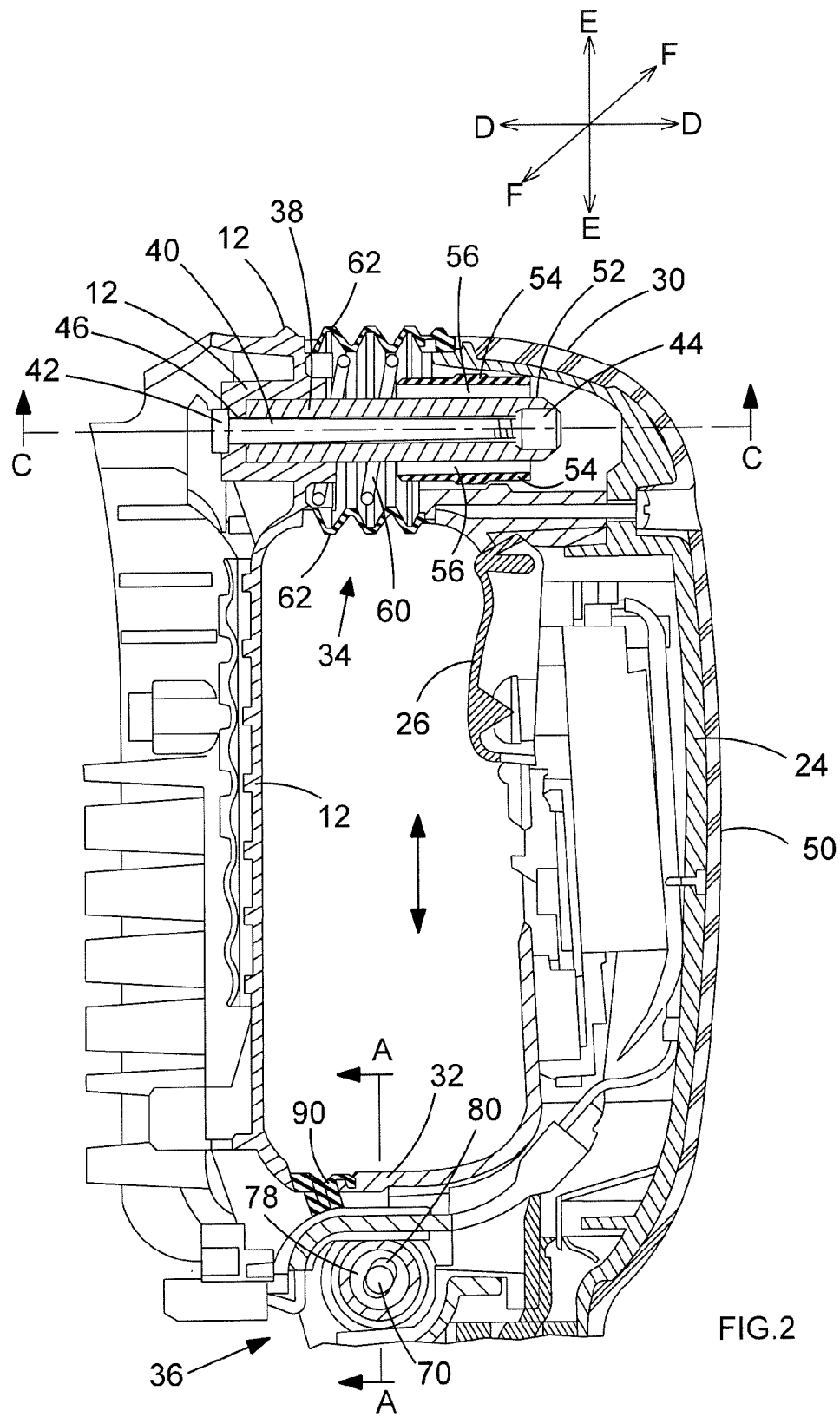
FIG. 2 shows a vertical cross sectional view of the rear handle of the existing design.
Figure 3:
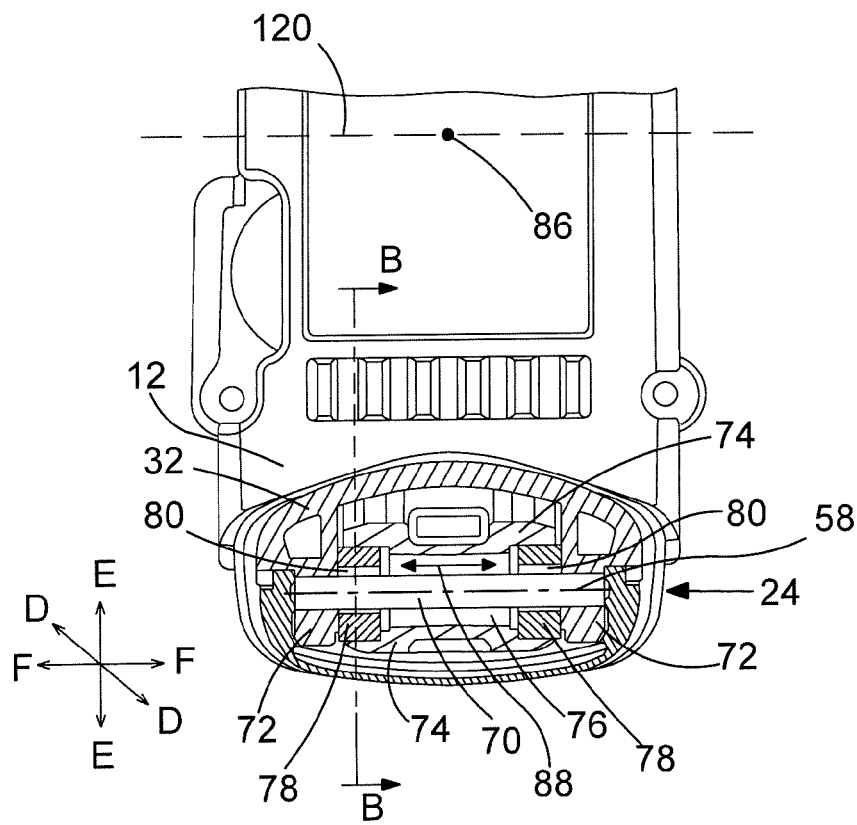
FIG. 3 shows a vertical cross sectional view of the lower section of the rear handle in the directions of Arrows A in FIG. 2.
Figure 4:
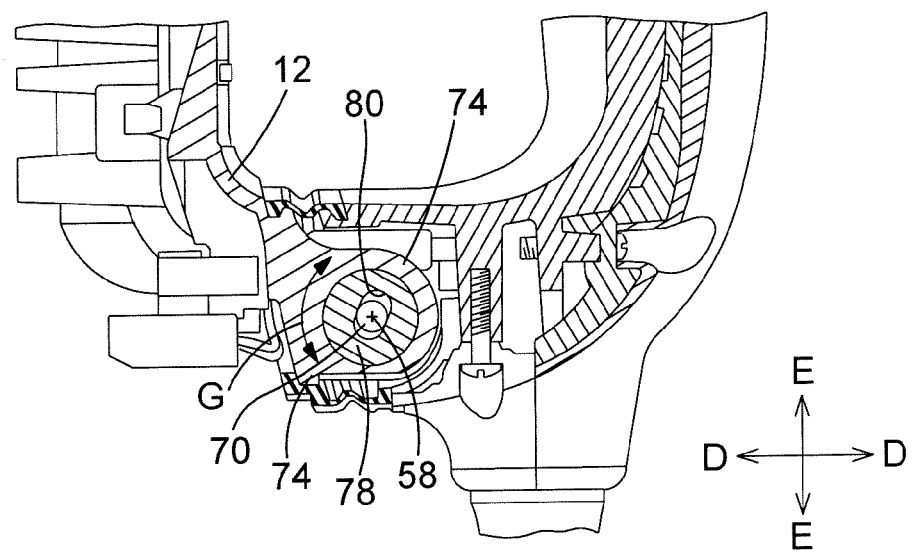
FIG. 4 shows a vertical cross sectional view of the lower section of the rear handle in the directions of Arrows B in FIG. 3.
Figure 7:
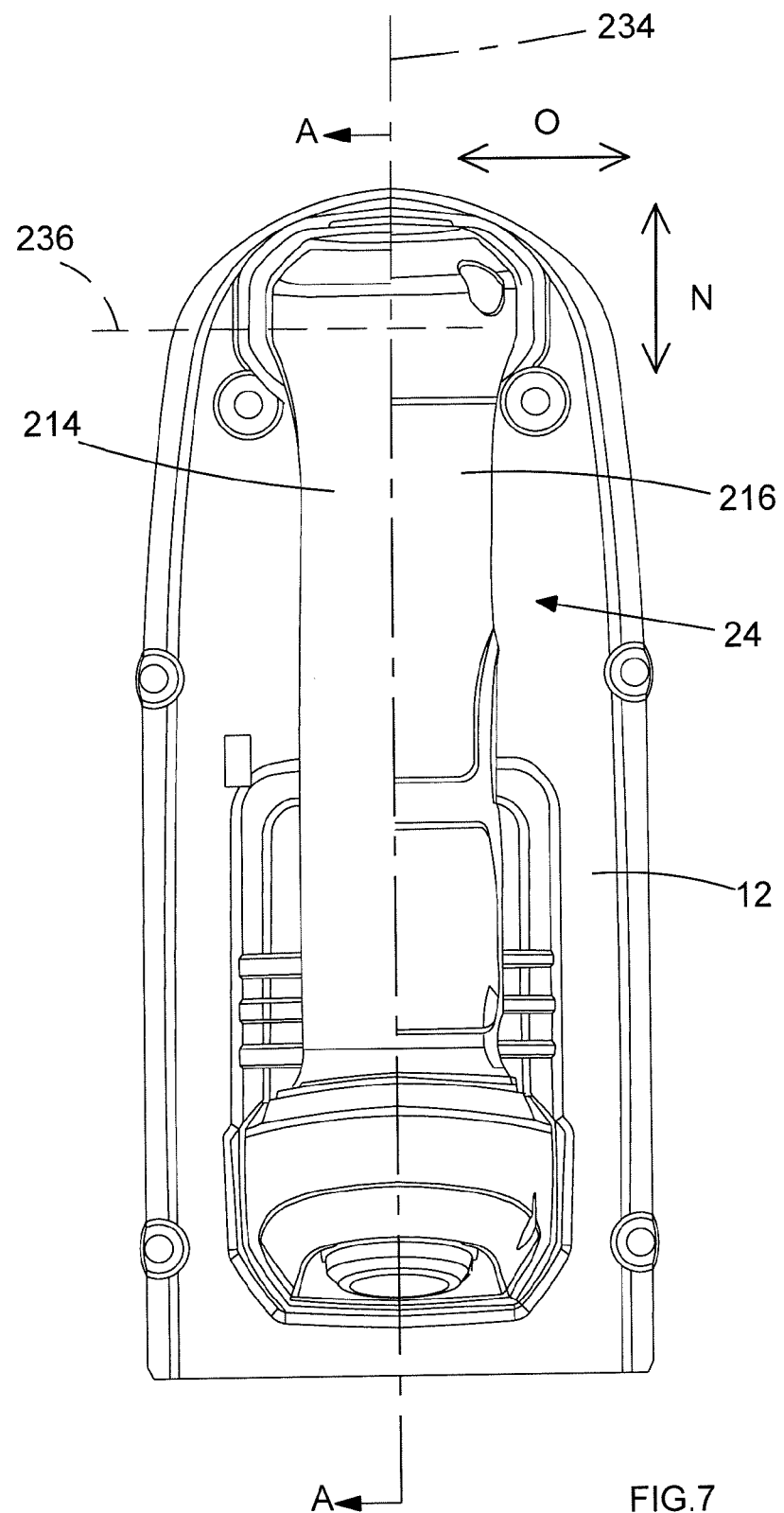
FIG. 7 shows a rear view of a hammer according to an embodiment of the present invention.

The free end of the rod 38 comprises a rectangular portion 52, the height (vertically) of which is the same as the rod 38 (as seen in FIG. 2), but the width (horizontally) of which is greater than the rod 38 (see FIG. 6).

Rigidly mounted inside the cavity at the top end 30 of the rear handle 24 is a plastic tubular sleeve 54. The shaft of the rod 38 passes through the length of the tubular aperture 56 formed by the sleeve 54. The length of the shaft of the rod 38 is greater than the length of the sleeve 54. The dimensions of the cross section area of the tubular aperture 56 of the sleeve are slightly greater than the dimensions of the cross section area of the rod 38 so that a small gap is formed between the outer surface of the shaft of the rod 38 and the inner wall of the tubular aperture 56. The rectangular portion 52 of the rod 38 locates at one end of the sleeve 54. The width of the rectangular end of the rod 38 is greater than the width of the tubular aperture 56 and the sleeve 54 (see FIG. 6). As such, it is too wide for it to pass through the tubular aperture 56. The other end of the rod 38 which is attached to the rear housing is located at the other end of the sleeve and is prevented from entering the tubular aperture 56 by the rear housing 12. The rod 38 can freely slide in an axial direction (Arrow D) within the sleeve 54, the range of axial movement being limited at one end of the range by the rear housing 12 engaging with one end of the sleeve 54 and at the other end of the range by the rectangular portion 52 engaging with the other end of the sleeve 54. As the dimensions of the cross section area of the tubular aperture 36 of the sleeve are slightly greater than the dimensions of the cross section area of the rod 38 to produce a small gap between the outer surface of the shaft of the rod 38 and the inner wall of the tubular aperture 56, limited movement of the rod 38 inside of the sleeve is allowed in the directions of Arrows E and F relative to rear housing 12.

Connected between the rear housing 12 and top end 30 of the rear handle 24 is a helical spring 60 which surrounds the rod 38. The spring biases the top end 30 of the rear handle 24 away from the rear housing 12. When the spring 60 biases the top end of the rear handle away by the maximum amount, the rectangular portion 52 engages with the end of the sleeve 54, preventing further movement of the top end 30 of the handle 24 away from the rear housing 12. The spring 60 is under a small compression force in this state. When the top end 30 of the rear handle is moved towards the rear housing 12 against the biasing force of the spring 60 by the application of an external force, the spring 60 becomes further compressed and shortens in length as the rod 38 axially slides within the sleeve 54 until the rear housing engages with the other end of the sleeve 54. When the external force is removed, the top end 30 of the rear handle 24 moves away from the rear housing due to the biasing force of the spring 60, the rod 38 axially sliding within the sleeve 54 until the rectangular portion 52 engages the end of the sleeve 54. The spring 60 also applies a biasing force on the rod 38 in a direction of Arrows E and F, urging the rod 38 to a central position within the sleeve 54. As such, when no external forces are applied to the rear handle 24, the spring 60 also locates the rod 38 centrally within the tubular aperture 56 so that a gap is formed around the whole of the outer surface of the rod and the inner wall of the sleeve 54. Movement of the rod in directions of Arrows E or F causes the rod 38 to move towards an inner wall of the tubular aperture 56 against a side way biasing force generated by the spring 60.

A set of bellows 62 connects between the rear housing 12 and the top 30 of the handle and surrounds the rod 38 and spring 60.

The lower mounting assembly 36 will now be described with reference to FIGS. 2 to 5.

The lower mounting assembly 36 comprises a metal pin 70 of circular cross section which is mounted inside the lower end 32 of the handle. The pin 70 has a longitudinal axis 58. The pin 70 extends sideways (generally in the direction of Arrow F) relative to the handle 24. The pin 70 is rigidly connected to the side walls 72 of the lower end 32 of the handle 24 and traverses the cavity inside of the handle 24.

The rear housing 12 comprises a projection 74 which extends rearwardly and projects into the cavity of the handle 24 at the lower end of the handle 24 in the vicinity of the pin 70. Formed through projection is a hollow passage 76. The hollow passage 76 similarly extends sideways (in the direction of Arrow F). The pin 70 passes through the length of the hollow passage 76, each end of the pin 70 extending beyond an end of the hollow passage 76 and connecting to the side wall 72 of the handle 24. The cross sectional area of the hollow passage 76 is greater than the cross sectional area of the pin 70, allowing the pin 70 to move sideways (in the direction of Arrows D and E) inside of the passageway 76, as well as being able to feely pivot (in the direction of Arrow G) within the hollow passage 76.

Located inside each end of the hollow passage 76 is an insert 78. Each insert 78 is of identical size and is rigidly connected to the inner wall of the hollow passage 76 to prevent movement of the insert 78 relative to the projection 74. An aperture 80, with an oval cross section, is formed through each insert 78 (see FIGS. 5A and 5B) and which extends in the same direction as the hollow passage 76. The pin 70 passes through each of the apertures 80. The two apertures 80 are aligned with each other inside of the projection 74.

The width 82 of the aperture 80 is marginally greater that the diameter of the pin 70. The length 84 of the aperture is twice the size of the diameter of the pin 70. As such, the pin can side sideways in a lengthwise direction 84 in the aperture 80.

The pin 70 is prevented from sliding sideways 88 through the aperture 80 by the side walls 72 of the lower end 32 of the handle 24, to which the pin 70 is rigidly attached, abutting directly against the sides of the inserts 78.

The hammer drill (excluding the rear handle 24) has a centre of gravity 86. A centre of gravity axis 120 passes through the centre of gravity. The centre of gravity axis is horizontal and extends width ways in the direction of Arrow F. The inserts are mounted inside the hollow passage 76 with aperture 80 orientated so that the lengthwise direction 84 of the aperture 80 extends tangentially to a circle (with radius R) centered on the centre of gravity axis 120 of the hammer drill (see FIG. 1) in a plane which extends in the directions of Arrows D and E (It should be noted that a plane which extends in the directions of Arrows D and E is a lengthwise vertical plane. A plane which extends in the directions of Arrows F and E is width way vertical plane).

When no force is applied to the rear handle 24 by an operator, the pin 70 is biased to the centre, in the lengthwise direction 84, of the aperture 80 of each insert 78, with equal space within the aperture 80 being left on either side of the pin 70 in the lengthwise direction 84. The biasing force acting on the pin 70 is generated by the spring 60 in the upper mounting assembly 34 which urges the pin 70 to the central position. Sliding movement of the pin 70 in the aperture, in the lengthwise direction 84, towards either of the ends of the oval aperture, is against the biasing force of the spring 60.

A set of bellows 90 connects between the rear housing 12 and the lower end 32 of the handle 24.

During use, the operator supports the hammer drill using the rear handle 24. When the operator places the cutting tool against a work piece, the operator applies a pressure to the rear handle 24, causing the rear handle 24 to move towards the rear housing 12 of the hammer. The top end 30 moves towards the rear housing 12 by the rod 38 axially sliding within the sleeve 54 against the biasing force of the spring 60, reducing the length of the spring 60 as it becomes compressed. The lower end 32 pivots about the pin 70. Depression of the trigger 26 activates the motor 6 which drives the cutting tool 16.

During the operation of the hammer, vibrations are generated by the operation of the motor 6 and the rotary drive and hammer mechanism 10. These vibrations are transferred to the rear housing 12. Significant vibrations are generated in two directions in particular. The first direction is in a linear direction (Arrow D) parallel to a longitudinal axis 92 of the cutting tool 16. The second direction is in a circular direction (Arrow H) about the centre of gravity axis 120 of the hammer. This is caused by the centre of gravity 86 being located away from the longitudinal axis 92 of the cutting tool 16, in this case, below the longitudinal axis 92.

Vibrations in the first direction are mainly absorbed by the upper mounting assembly 34, and by the spring 60 in particular. As the rear housing 12 vibrates in the first direction, the rod 38 can axially slide in and out of the sleeve 54 under the influence of the vibrations, the spring 60 expanding and compressing as it does so. The dampening action of the spring 60 results in a reduction in the amount of vibration transferred to the rear handle 24 from the rear housing 12. As the rod 38 axially slides in and out of the sleeve 54 under the influence of the vibrations, the rear handle 12 pivots about the pin 70 in the lower mounting assembly 36 as it engages with the side walls of the oval aperture 80 as the pin 70 is urged by the vibrations in the first direction to move in a direction parallel to the longitudinal axis 92 of the cutting tool 16.

If the operator applies more pressure to the rear handle 24, the spring 60 becomes more compressed, thus transferring the additional force to the rear housing 12 of the hammer drill. However, its compression and expansion due to the vibration continues to result in a reduction of vibration being transferred to the rear handle 24 from the rear housing 12.

Vibrations in the second direction result in a twisting movement of the housing 2, motor 6 and the rotary drive and hammer mechanism 10 about the centre of gravity axis 120 (Arrow H). These vibrations are mainly absorbed by the lower mounting assembly 36. As the pin 70 is located in the oval slot 80 of the insert 78 which is orientated so that the lengthwise direction 84 of the aperture 80 extends tangentially to a circle centered on the centre of gravity axis 120 which extends in a lengthwise vertical plane, the pin 70 can slide tangentially relative to the centre of gravity axis 120, allowing housing 2, motor 6 and the rotary drive and hammer mechanism 10 to twist about the centre of gravity axis 120 relative to the rear handle 24. This twisting movement is then damped due to the action of the spring 60 in the upper mounting mechanism 34 which biases the pin 70 to the centre of the oval slot 80. The twisting movement of the housing 2, motor 6 and the rotary drive and hammer mechanism 10 about the centre of gravity axis 120 relative to the rear handle 24 is accommodated by the top mounting assembly 34 by the gap formed between the outer surface of the rod 38 and the inner wall of the sleeve 54. As the rod 38 being urged to a central position within the sleeve 54 by the spring 60, when vibrations in the second direction are applied, the rod 38 can move sideways (Arrow E) within the sleeve 54. The spring 60, which biases the rod 38 centrally within the tubular aperture 36, also dampens the movement of the rod 38 in the sleeve 54.

An embodiment of the invention will now be described with reference to FIGS. 7 to 15. Where the same features shown in the embodiment are present in the design of the rear handle assembly of the existing design of hammer drill are present, the same reference numbers have been used.

The upper mounting assembly 34 in the embodiment is the same as the upper mounting assembly in the existing design of hammer except for method by which the metal rod 38 is attached to rear housing, the location of the helical spring 60, the sleeve 54 has been replaced by a structure integrally formed within the clam shell of the handle.

The upper mounting assembly 34 will now be described with reference to FIGS. 7 to 15. The upper mounting assembly 34 comprises a metal rod 38 which is attached at a first end 200 to the rear housing 12 using a bayonet type connection. The first end 200 forms a T shape with two arms 202, 204 projecting sideways from the longitudinal axis of the rod 38. Formed in the rear housing 12 is a chamber 206 formed by walls 211 of the rear housing 12. A rectangular entrance 208 is formed through the rear wall of the rear housing 12 which has dimensions slightly larger than those of the cross section of the T shaped first end 200 in a direction perpendicular to the longitudinal axis of the rod 38. The orientation of the rectangular entrance 208 is such that the longer sides of the entrance 208 extend vertically. The T shaped first end 200 is able to pass through the entrance 208 from behind the rear housing 12 and locate within the chamber 206, the two arms 202, 204 being capable of being located entirely within the chamber 206. The shape and dimensions of the chamber 206 are such that it allows for the first end 200 of the rod 38 with the two arms 202, 204 to be rotated through 90 degrees within the chamber 206 in a anti-clockwise direction as shown in FIG. 9. Once rotated through 90 degrees, the first end 200 of the rod 38 is prevented from being removed from the chamber 206 as the arms 202, 204 extend perpendicularly to the longer sides of the entrance 208 of the chamber 206 and therefore abut against the rear wall of the rear housing 12 within the chamber 206 as shown in FIG. 9. The dimensions of the chamber 206 are such that, when the arms 202, 204 are extended perpendicularly to the longer sides of the entrance 208 of the chamber 206 as shown in FIG. 9, the first end 200 of the rod 38 is held rigidly with the chamber 206 with the remainder of the rod 38 protruding rearwardly away from the rear housing 12 towards the rear handle. This provides a bayonet connection between the rod 38 and the rear housing 12. To remove the first end 200 from the chamber 206, the first end 200 of the rod 38 with the two arms 202, 204 is rotated through 90 degrees in a clockwise direction as shown in FIG. 9 and then passed through the entrance 208. This provides a simpler method of assembly and avoids the need for the use of bolts or screws.

Figure 8:
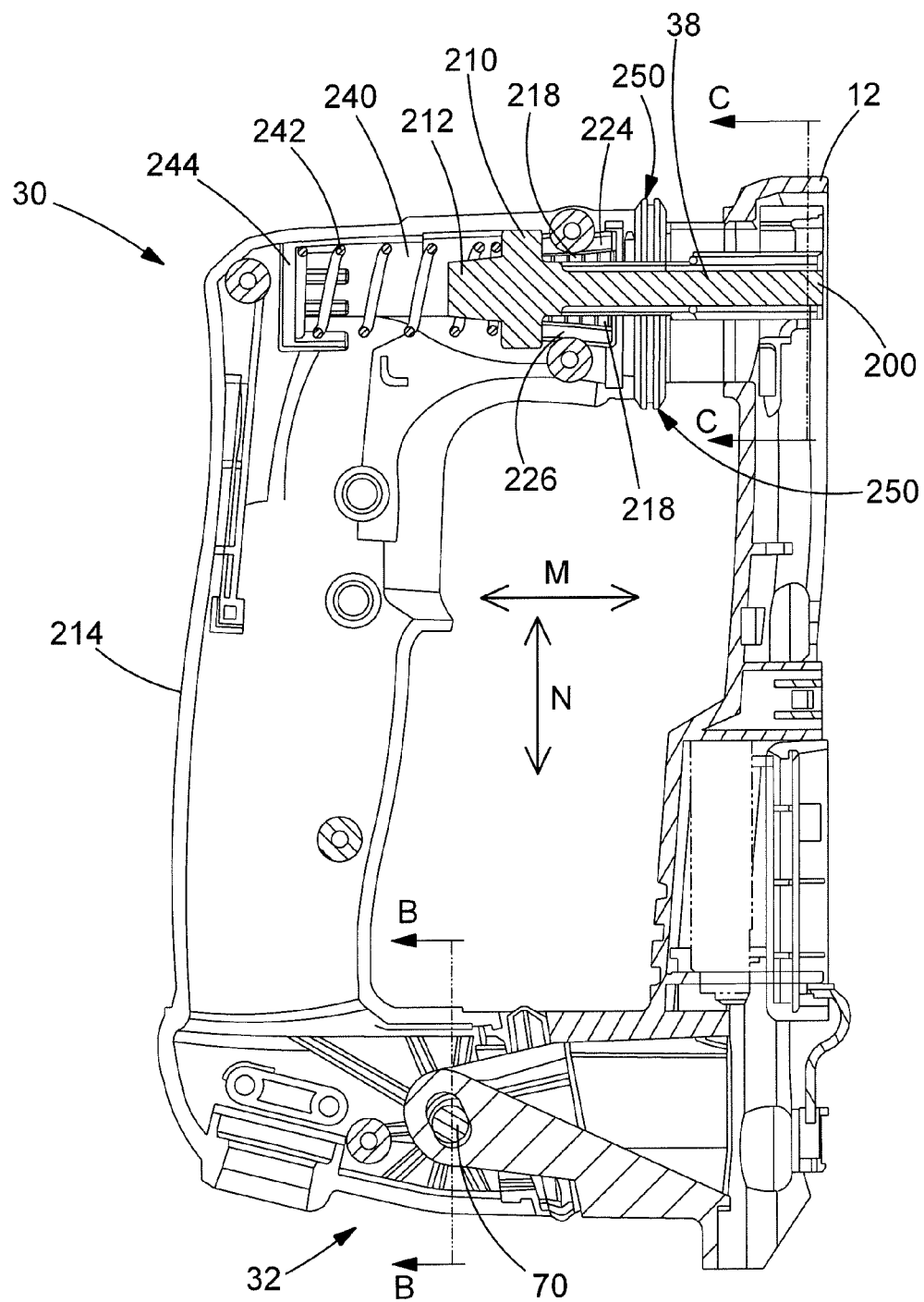
FIG. 8 shows a vertical cross section in the direction of Arrows A in FIG. 7 of the rear of the hammer in accordance with the embodiment of the present invention.
Figure 9:
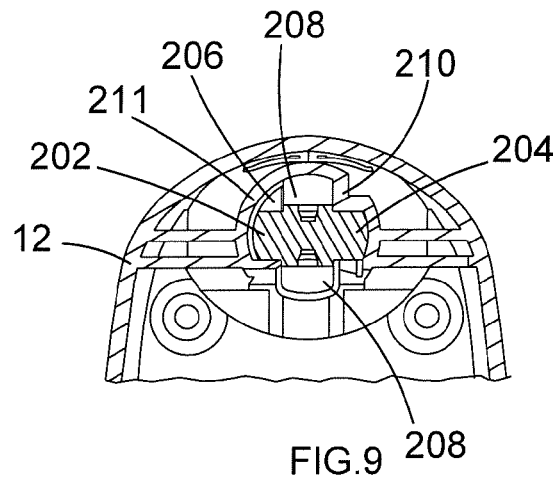
FIG. 9 shows a vertical cross section in the directions of Arrow C in FIG. 8.
Figure 10:
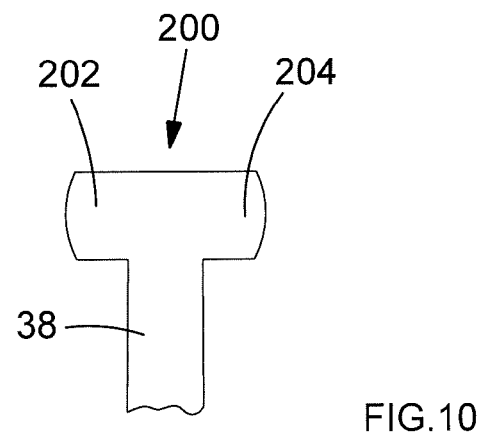
FIG. 10 shows a schematic view of the first end of the rod.

The second end of the rod 38 comprises a circular flange 210 and a projection 212 which extends in the same direction as the longitudinal axis of the rod 38 as seen in FIG. 8. Integrally formed within the plastic clam shells 214, 216 of the rear handle are a plurality of ribs 218 which extend horizontally towards a passageway 220 formed, in part, by the ends of the ribs 218. The ends 222 of the ribs 218 form the vertical sides of the passageway 220. Integrally formed within the plastic clam shells 214, 216 of the rear handle are two walls 224, 226 which extend horizontally. The walls 224, 226 form the top and bottom horizontal sides 228, 230 of the passageway 220. The shaft of the rod 38 passes through the passageway 220. The length of the shaft of the rod 38 is greater than the length of the passageway 220. The ends 222 of the ribs 218 are designed so that they form a convex curved support surface which can engage with the vertical sides of the shaft of the rod 38. The surfaces 228, 230 of the walls 224, 226 which are capable of engaging with the top and bottom sides of the shaft of the rod 38 are curved in a convex manner.

Figure 11:
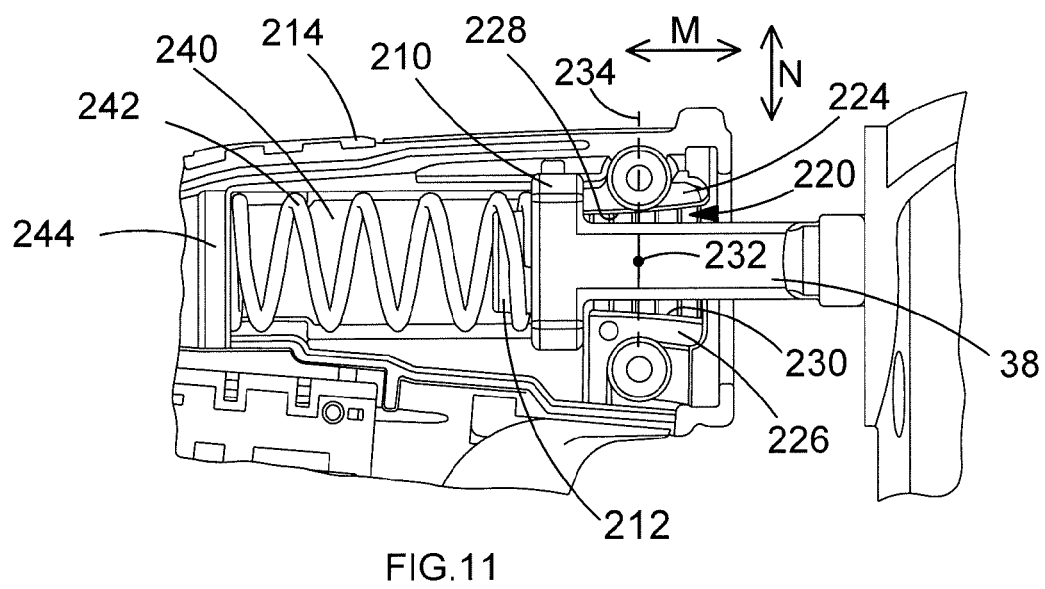
FIG. 11 shows a vertical cross sectional view of the top half of the rear handle.
Figure 12:
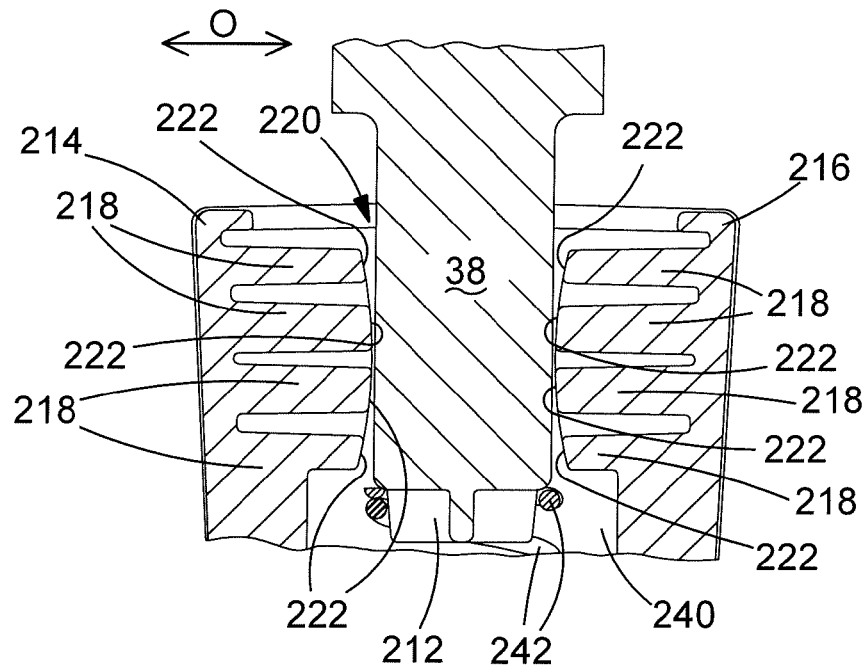
FIG. 12 shows a horizontal cross sectional view of the passageway and rod.
Figure 13:
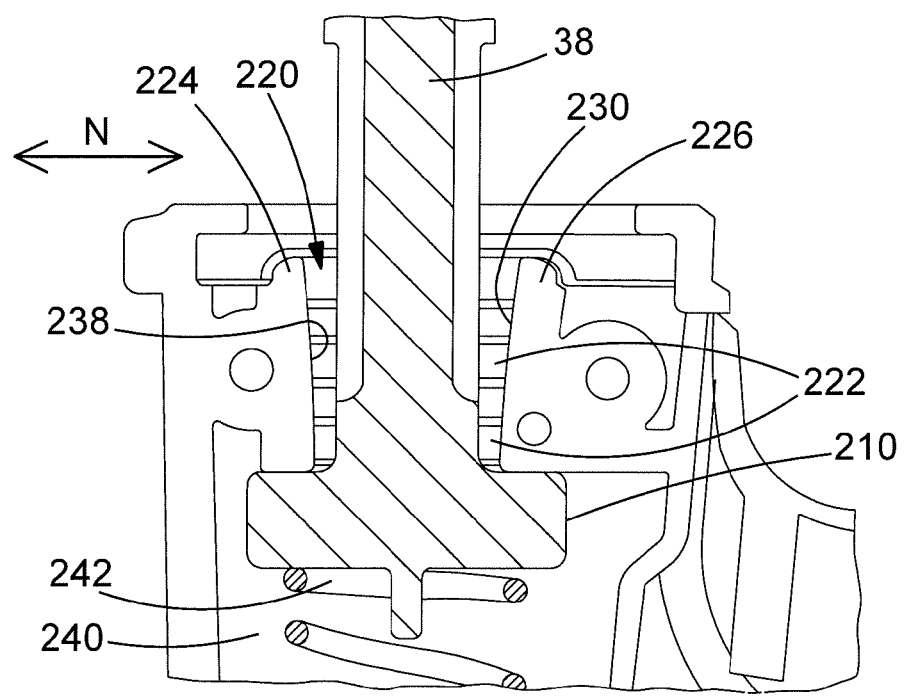
FIG. 13 shows a vertical cross sectional view of the passageway and rod.
Figure 14:
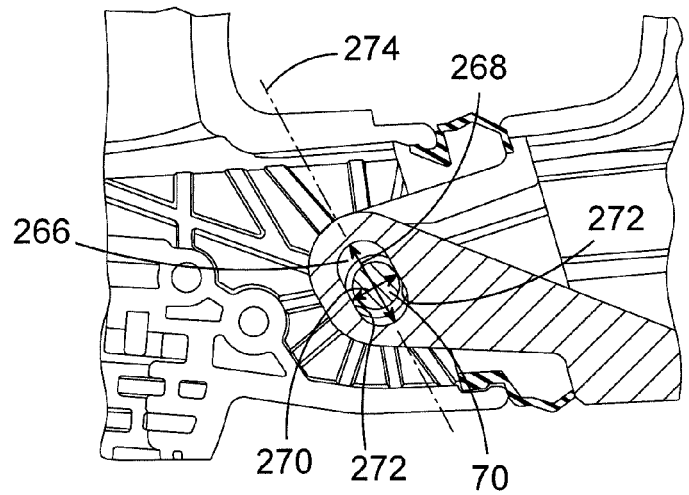
FIG. 14 shows a vertical cross sectional view of the lower half of the rear handle.
Figure 15:
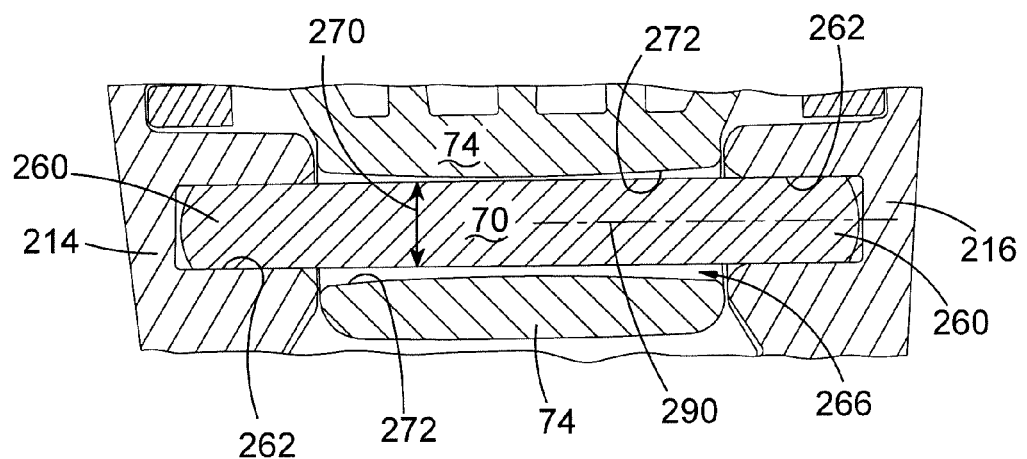
FIG. 15 shows a cross sectional view of the pin in hollow passageway.

The diameter of the circular flange 210 of the rod 38 is greater than the width and height of the passageway 220 (see FIG. 11). As such, it is too wide for it to pass through the passageway 220. The first end of the rod 38 which is attached to the rear housing by the bayonet connection is on the other side of the passageway 220 and is prevented from entering the passageway 220 by the rear housing 12 engaging the clam shells 214, 216 of the rear handle.

The rod 38 can freely slide in an axial direction (Arrow M) within the passageway 220 the range of axial movement being limited at one end of the range by the rear housing 12 engaging with clam shells 214, 216 of the rear handle and at the other end of the range by the flange 210 engaging with the other end of the passageway 220. The dimensions of the cross section area of the passageway 220 at the narrowest section are slightly greater than the dimensions of the cross section area of the shaft of the rod 38 to produce a small gap between the outer surface of the shaft of the rod 38 and the inner walls of the passageway 220. This allows limited movement of the rod 38 inside of the passageway in the directions of Arrows N and O relative to rear housing 12. The convex curved support surface formed by the ends 222 of the ribs 218 and the convex curved surfaces 228, 230 of the walls 224, 226 enable the shaft of the rod 38 to pivot over a limited range of movement about an approximate point 232 within the passageway about a vertical axis 234 and a horizontal axis 236 which is perpendicular to the longitudinal axis of the rod 38.

It will be appreciated that the rear clam shells 214, 216 of the handle may be designed so that either the support surface formed by the ends 222 of the ribs 218 or the support surfaces 228, 230 of the walls 224, 226 only are curved to restrict the pivotal movement to one direction, either about the vertical axis 234 or the horizontal axis 236 which is perpendicular to the longitudinal axis of the rod 38.

Mounted within the clam shells of the rear handle within a tubular passageway 240 is a helical spring 242. One end of the spring 242 surrounds the projection 212, which holds the end of the spring 242 in place, and abuts against the flange 210. The other end of the spring 242 abuts against an internal wall 244 of the clam shells. The spring biases the top end 30 of the rear handle 24 away from the rear housing 12. When the spring 242 biases the top end of the rear handle away by the maximum amount, the flange 210 engages with the entrance to the passageway 220 preventing further movement of the top end 30 of the handle 24 away from the rear housing 12. The spring 242 is under a small compression force in this state. When the top end 30 of the rear handle is moved towards the rear housing 12 against the biasing force of the spring 242 by the application of an external force, the spring 242 becomes further compressed and shortens in length as the rod 38 axially slides within the passageway 220 until the rear housing 12 engages with the clam shells 214, 216 of the rear handle. When the external force is removed, the top end 30 of the rear handle 24 moves away from the rear housing due to the biasing force of the spring 242, the rod 38 axially sliding within the passageway 220 until the flange 210 engages the entrance of the passageway. The spring 242 also applies a biasing force on the rod 38 in a direction of Arrows N and O, urging the rod 38 to a central position within the passageway 220. As such, when no external forces are applied to the rear handle 24, the spring 242 also locates the rod 38 centrally within the passageway 220 so that a gap is formed around the whole of the outer surface of the rod and the inner walls of the passageway 220. Movement of the rod in directions of Arrows N or O causes the rod 38 to move towards an inner wall of the passageway against a side way biasing force generated by the spring 242.

A set of bellows 250 connects between the rear housing 12 and the top 30 of the handle and surrounds the part of the rod 38 located between the two.

The lower mounting assembly 36 in the embodiment is exactly the same as the lower mounting assembly in the existing design except for the construction of the passageway 76 for the pin 70 and the mounting of the ends of the pin 70 within the handle.

The lower mounting assembly 36 comprises a metal pin 70 of uniform circular cross section along its length which is mounted inside the lower end 32 of the handle. The pin 70 has a longitudinal axis 290 and extends sideways relative to the handle 24. The ends 260 of the pin 70 locate within pockets 262 formed the inner walls of the clam shells 214, 216, the ends 260 being loosely held within the side walls 72 of the lower end 32 of the handle 24 to allow limited movement within the pockets 262. The pin 70 traverses the cavity 264 inside of the handle 24.

The rear housing 12 comprises a projection 74 which extends rearwardly and projects into the cavity 264 of the handle 24 at the lower end of the handle 24 in the vicinity of the pin 70. Formed through projection is a hollow passage 266. The hollow passage 266 similarly extends sideways.

The pin 70 passes through the length of the hollow passage 266, each end of the pin 70 extending beyond an end of the hollow passage 266 and connecting to the side wall 72 of the handle 24. The cross sectional shape of the passage 266 along the full length of the passage is that of an oval, the oval being long in a first direction 268 (length) and shorter in a second direction 270 (width). The length 268 of the oval cross section of the hollow passage 76 is of a constant value along the full length of the hollow passage 76. The width 270 varies along the length of the hollow passage 76 to produce two symmetrical curved convex surfaces 272 which are capable of engaging the side of the pin 70. The narrowest point is at the centre of the hollow passage 76 where it is just slightly larger than the diameter of the pin 70.

However, it will be appreciated that, as an alternative design, the length 268 of the oval cross section can also vary along the length of the passage way 76 to produce two symmetrical curved convex surfaces that are capable of engaging the side of the pin 70. The narrowest point is at the centre of the hollow passage 76 where it is just slightly larger than the diameter of the pin 70.

The lower mounting assembly of the embodiment is capable of functioning in the same manner as the example described above with reference to FIGS. 1 to 6. However, in addition, the curved walls of the passageway allow the lower end of the handle to pivot about an axis 274 which extends parallel to the lengthwise direction 268 of the oval cross section. The loose fitting ends 260 of the pin 70 also assist in such movement.

The overall embodiment of the rear handle is capable of functioning in the same manner as that of the example described above with reference to FIGS. 1 to 6. However the use of the combination of the passageway with curve support surfaces 222, 238, 230 in relation to the rod 38 and the hollow passage 76 with curved side walls 272 with the pin 70 additionally allows the rear handle an overall limited amount of twisting movement (up to 10 degrees) approximately about the longitudinal axis of the rear handle providing addition vibration damping.

The invention claimed is:

1. A power tool comprising:
   a housing;
   a handle having two ends, the first end being moveably mounted to the housing via a first mounting assembly, the second end being moveably mounted to the housing via a second mounting assembly; and
   a biasing mechanism connected between the housing and the handle;
   wherein the first mounting assembly comprises:
   a first part on one of the housing or the first end of the handle, and a second part on the other of the housing or the first end of the handle,
   the first part comprising two clam shells forming a passageway along a longitudinal axis, the second part comprising a rod also extending along the longitudinal axis, wherein the rod is located in and axially slidable within the passageway to enable the first end of the handle to move towards or away from the housing; and
   wherein the two clam shells each include a plurality of ribs extending radially towards the rod, the plurality of ribs having ends that form a curved convex support surface around at least a portion of the passageway, the curved convex support surface engaging a side of the rod to enable the rod to pivot within the passageway about an axis which is perpendicular to the longitudinal axis.

2. The power tool of claim 1 wherein the passageway comprises four internal walls which each substantially extend the length of the passage way, wherein at least two of the walls face each other and both comprise curved convex support surfaces.

3. The power tool of claim 2 wherein all four walls comprise curved convex support surfaces.

4. The power tool of claim 3 wherein the cross sectional shape of the passageway is substantially rectangular.

5. The power tool of claim 1 wherein the passageway is integrally formed within either the housing or the handle.

6. The power tool of claim 1 wherein the rod is attached at a first end to the housing, the passageway being formed within the one end of the handle.

7. The power tool of claim 6 wherein the rod is attached to the housing using a bayonet connection.

8. The power tool of claim 1 wherein the second mounting assembly comprises:
   a first part mounted on the housing and a second part mounted on the one end of the handle, one part comprising a support, the other part comprising a pin, having a longitudinal axis, located in the support which is capable of being rotated in the support to enable the end of the handle to rotate relative to the housing and to move linearly in the support to enable the end of the handle to move linearly relative to the housing;
   wherein the support comprises a passage in which the pin is located;
   wherein the passage has a cross section which is substantially uniform in shape along the length of the passage, which cross section has a shape with a first length in a first direction and a second width smaller than the first length in a second perpendicular direction, the pin being capable of freely moving within the passage either rotationally about its axis to enable the end of the handle to rotate relative to the housing or linearly in a direction of the first length to enable the end of the handle to move linearly relative to the housing;
   wherein that the size of the second width varies along the length of the passage to provide at least one curve convex surface along at least part of the length of the passage which is capable of being engaged by the side of the pin to enable the pin to pivot within the passage about an axis parallel to the direction of the first length.

9. The power tool of claim 8 wherein the size of the first length of the shape of the cross section remains constant along the length of the passage.

10. The power tool of claim 8, wherein the size of the first length of the shape of the cross section varies along the length of the passage to provide at least two curved convex surfaces along at least part of the length of the passage.

11. The power tool of claim 8 wherein the size of the second width varies along the length of the passage to provide at least two curved convex surfaces along at least part of the length of the passage.

12. The power tool of claim 11, wherein in the two curved convex surfaces are symmetrical.

13. The power tool of claim 8, wherein the shape of the cross section of the passage is oval.

14. The power tool of claim 8, wherein the biasing mechanism biases the pin to a predetermined position within the passage.

15. The power tool of claim 8, wherein the part comprising the pin further comprises a pair of pockets in which the ends of the pin are held in a loose manner.

16. The power tool of claim 15 wherein the part comprising the pin further comprises a cavity in which the support is located, the pockets being located on either side of the support.

* * * * *